United States Patent [19]
Long

[11] 3,799,182
[45] Mar. 26, 1974

[54] ADD-ON STOPPER VALVE FOR EXISTING PIPING

[75] Inventor: George M. Long, Hinsdale, Ill.

[73] Assignee: Institute of Gas Technology, Chicago, Ill.

[22] Filed: Apr. 28, 1972

[21] Appl. No.: 248,660

[52] U.S. Cl.................... 137/15, 137/318, 138/94
[51] Int. Cl...................... B23b 41/08, F16e 41/04
[58] Field of Search........ 137/15, 317, 318; 138/89, 138/94, 94.3

[56] References Cited
UNITED STATES PATENTS

| | | | |
|---|---|---|---|
| 2,899,983 | 8/1959 | Farris | 137/318 X |
| 2,972,915 | 2/1961 | Milanovits et al. | 137/138 |
| 2,983,477 | 5/1961 | Merrill | 137/318 X |
| 3,272,033 | 9/1966 | Leopold, Jr. et al. | 137/318 X |
| 3,533,424 | 10/1970 | Wedge | 137/318 X |

Primary Examiner—Alan Cohan
Assistant Examiner—David R. Matthews
Attorney, Agent, or Firm—Dominik, Knechtel, Godula & Demeur

[57] ABSTRACT

The invention comprises an add-on valve which includes, generally, a holding chamber which is adapted to be fixedly secured to a pipe, a gate valve assembly which is adapted to be removably affixed to the holding chamber, a saw chamber assembly including a saw for sawing an opening into the pipe, a pipe plug assembly including a closure which is operable to block the flow of fluid in the pipe, an insertion chamber assembly for inserting the pipe plug assembly into the holding chamber, and a completion bonnet for completing the assembly of the add-on valve.

8 Claims, 13 Drawing Figures

PATENTED MAR 26 1974 3,799,182
SHEET 1 OF 3

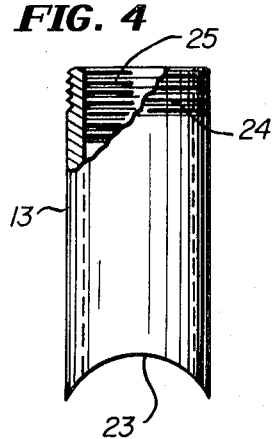
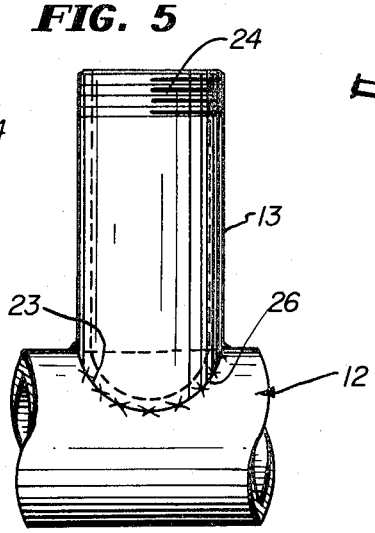
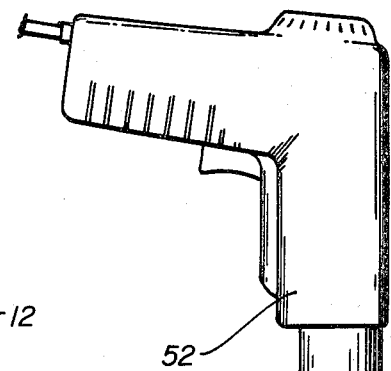
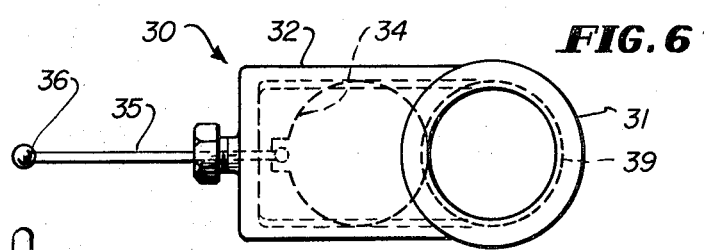
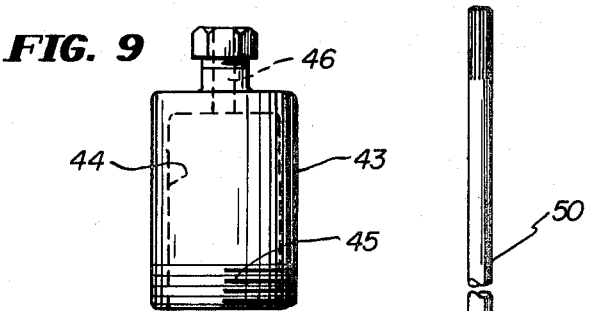
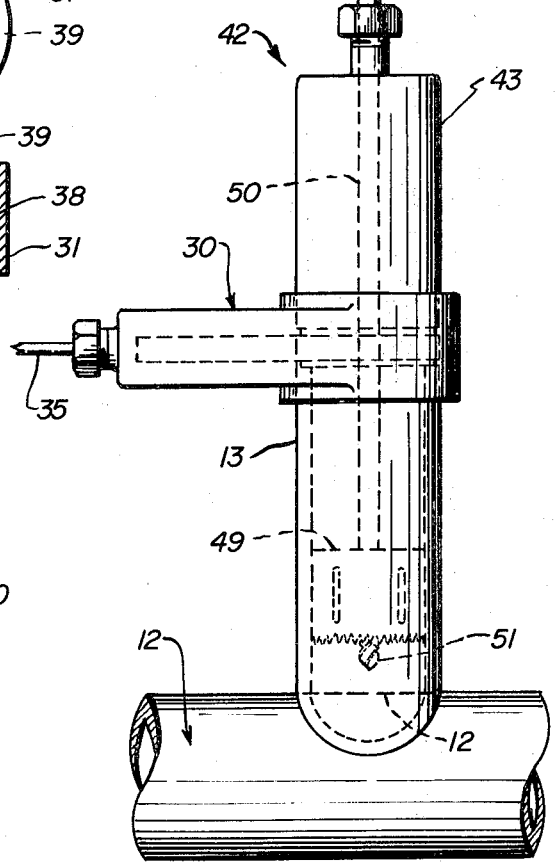
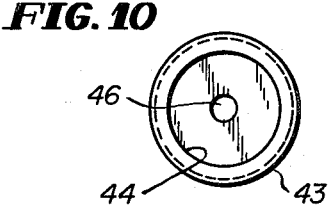
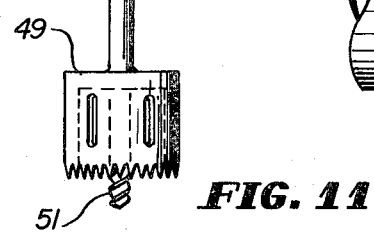

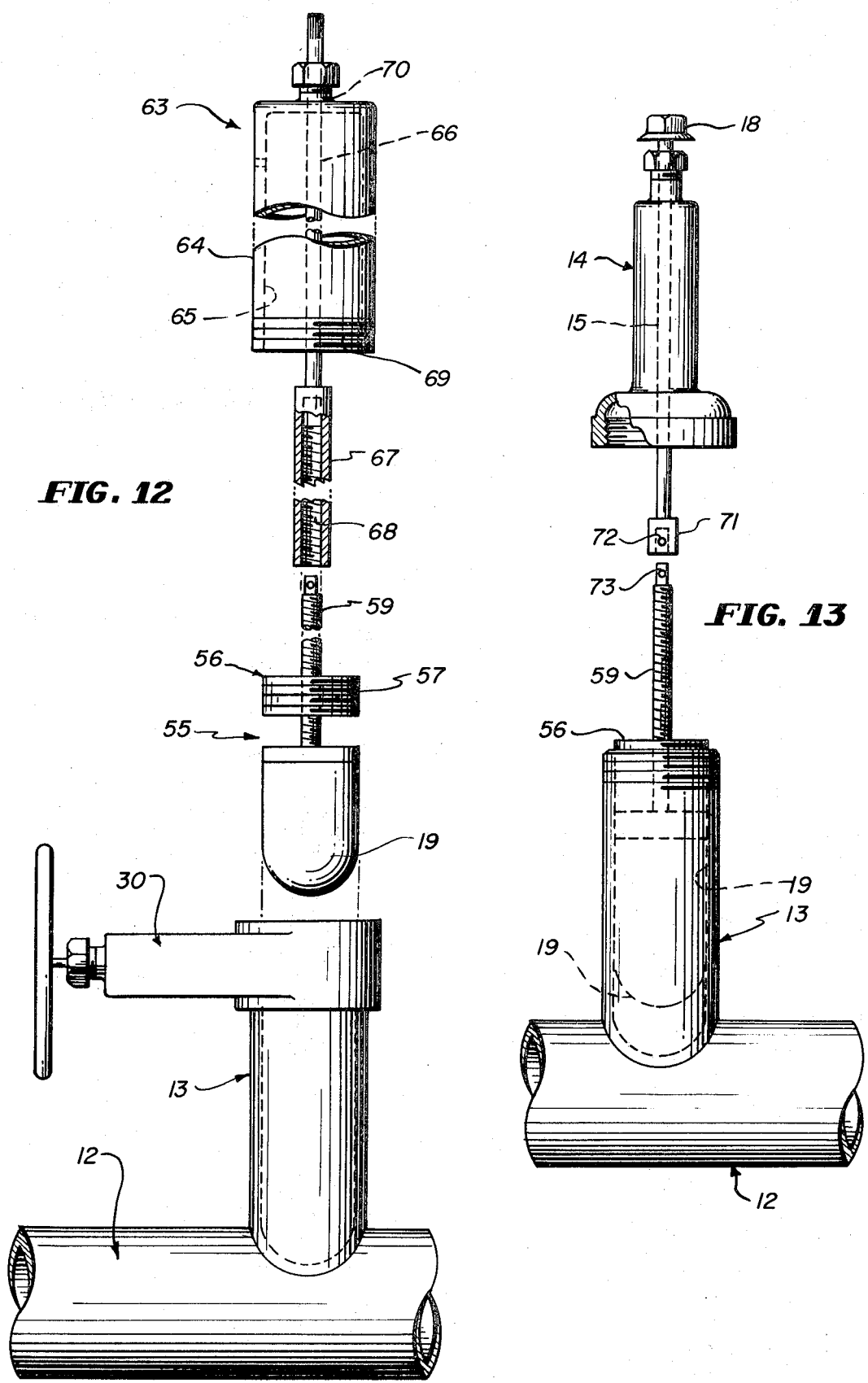

ADD-ON STOPPER VALVE FOR EXISTING PIPING

This invention relates, in general, to improved add-on valves and, more particularly, to improved add-on stopper valves which can be inexpensively affixed or added to existing fluid piping systems, without shut-down or interruption of flow.

There presently exists valves which can stop the flow of fluid on a pipe when "turned off" and restore it when "turned on". These valves, however, normally include an inline body which is designed to be installed during initial construction of a pipe system. If they are to be added to an existing pipe system, a full cut-in is required. Such cut-ins require isolation of the work section with adjacent valves or stoppers, blow-down and-/or draining to depressurize, purging with inert gases or fluids, or flame control if welding and/or flame cutting is to be done, cut-in and welding or sleeving of the valve and adjacent flanges or pipe sections, repurging with the primary fluid, repressurization and opening of valves or removal of stoppers, and the need for a fluid pipe or hose bypass to maintain service beyond the work section.

The add-on stopper valves of the present invention, on the other hand, can be added to existing fluid piping systems, without the need of a full cut-in of the type described above and without shut-down or interruption of flow. The add-on valve of the present invention, therefore, greatly simplifies and reduces the time and cost of valve installation. This fact, in turn, makes feasible the installation of more valves in existing systems which would provide at least a two-fold advantage of improving the safety of operations of such existing systems by permitting more rapid shut-down of damaged sections, and improve the quality of service by interrupting the supply to fewer customers via smaller isolated sections.

Accordingly, it is an object of the present invention to provide an improved add-on stopper valve.

More particularly, it is an object to provide improved add-on valves which can be inexpensively added to existing fluid piping systems, without shut-down or interruption of flow.

Another object is to provide an improved add-on valve and method for affixing it to an existing fluid piping system, without shut-down or interruption of the flow in said system.

A still further object is to provide an improved add-on valve comprising many elements which are reusable, in installing other add-on valves.

Other objects of the invention will in part be obvious and will in part appear hereinafter.

The above objectives are accomplished with the add-on valve and method of the present invention which includes, generally, a holding chamber which is adapted to be fixedly secured to a pipe, a gate valve assembly which is adapted to be removably affixed to the holding chamber, a saw chamber assembly including a saw for sawing an opening into the pipe, a pipe plus assembly including a closure which is operable to block the flow of fluid in the pipe, an insertion chamber assembly for inserting the pipe plug assembly into the holding chamber, and a completion bonnet for completing the assembly of the add-on valve. In installing the add-on valve, the method of the present invention generally includes the following steps. The holding chamber first is secured to the pipe and then the gate valve assembly is removably affixed to the holding chamber. The saw chamber assembly next is affixed to the gate valve assembly, the gate valve opened, and the saw of the saw chamber assembly then manipulated to cut an opening into the pipe. Thereafter, the saw blade is retracted into the saw chamber assembly, the gate valve closed, and the saw chamber assembly removed. Next, the pipe plug assembly is inserted into the insertion chamber assembly and the latter affixed to the gate valve assembly. The gate valve then again is opened, and the pipe plug assembly secured within the holding chamber. The assembly is completed by then removing the gate valve assembly and the insertion chamber assembly, and affixing the completion bonnet to the holding chamber. Thereafter, the add-on valve can be operated to extend the closure into and out of the pipe through the holding chamber and the opening formed in the pipe, to block or permit the passage of fluid through the pipe.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the present invention, reference should be had to the following detailed description taken in connection with the accompanying drawings in which:

FIG. 4 is a side plan view of the holding chamber, partially sectionalized to illustrate its construction;

FIG. 5 is a side plan view generally illustrating the manner in which the holding chamber is affixed to a pipe;

FIG. 6 is a top plan view of the gate valve assembly;

FIG. 7 is a side plan view of the gate valve assembly, partially sectionalized to illustrate its construction;

FIG. 8 is a side plan view showing the holding chamber, the gate valve assembly and the saw chamber assembly in assembled relationship in preparation for sawing a hole in a pipe;

FIG. 9 is a side plan view of the saw chamber of the saw chamber assembly;

FIG. 10 is a bottom plan view of the saw chamber of FIG. 9;

FIG. 11 is a side plan view of the saw assembly;

Figure 2:
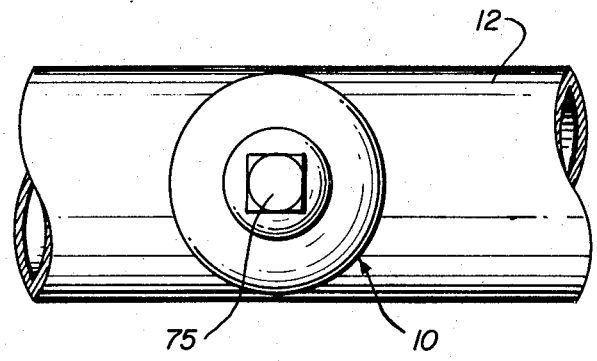
FIG. 2 is a top plan view of the add-on valve, as illustrated in FIG. 1.
Figure 2:
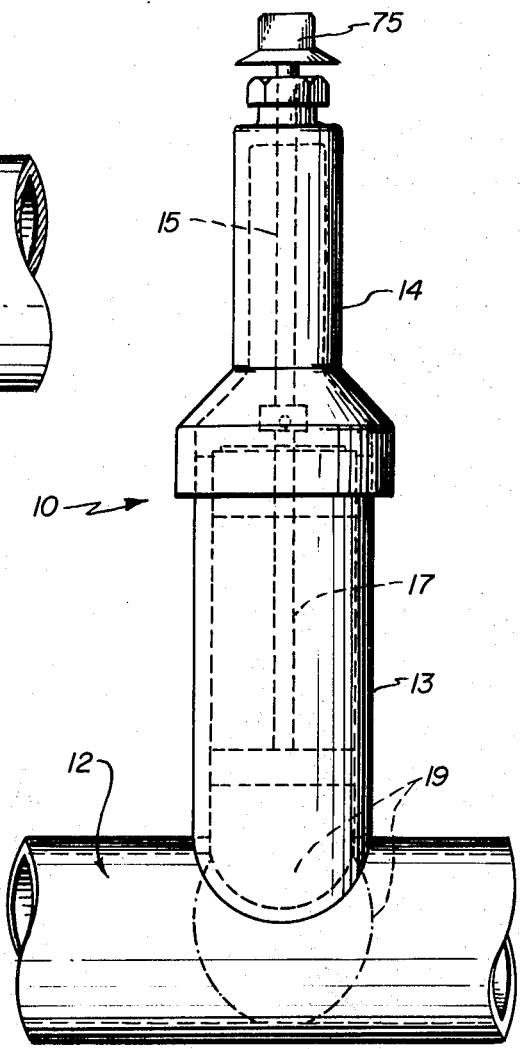

FIG. 12 is a plan view, partially sectionalized, of the pipe plug assembly and the insertion chamber assembly, generally illustrating the manner in which they are affixed together and assembled within the holding chamber with the valve gate assembly removably affixed thereto; and FIG. 13 is a plan view generally illustrating the pipe plug assembly affixed within the holding chamber and the manner in which the completion bonnet is coupled with the pipe plug assembly and affixed to the holding chamber to complete the installation of the add-on valve.

Similar reference characters refer to similar parts throughout the several views of the drawings.

Figure 1:
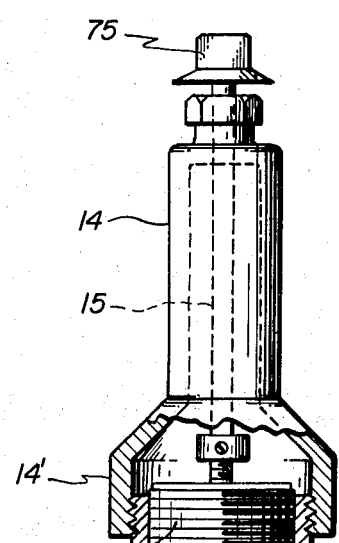
FIG. 1 is a side plan view of the add-on valve of the present invention, affixed to a pipe.
Figure 3:
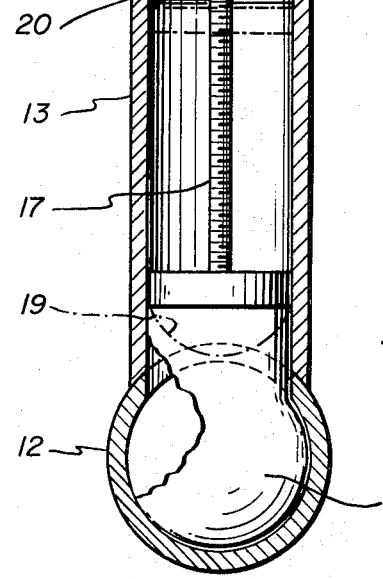
FIG. 3 is a sectional view of the add-on valve installed on a pipe, generally illustrating the manner in which the add-on valve is operated to block the passage of fluid in the pipe.

Referring now to the drawings, in FIGS. 1 and 2 there is illustrated an add-on valve 10 which has been affixed to a pipe 12. The pipe 12 can be a 1¼ inch through 4 inch nominal pipe size, and can be of steel, cast iron, ductile iron or plastic. The add-on valve 10, when the installation of the latter is completed, generally includes a holding chamber 13 in the form of a cylinder having one end thereof affixed to the pipe 12 and the other end thereof closed and sealed with a completion bonnet 14. Within the completion bonnet 14 and the holding chamber 13, there is disposed a closure 19 which, in the illustrated example, is a flexible cylinder which can be extending into the pipe 12 to block the flow of fluid therein. The closure 19, when compressed against the side wall of the pipe 12 deforms and spreads, generally as illustrated, to close off the pipe. The closure 19 is affixed to one end of a pipe plug shaft 17, which is coupled to a bonnet shaft 15 extending through and out of the completion bonnet 14. The exposed terminal end of the bonnet shaft 15 has a hand wheel or nut 18 or the like affixed to it for moving the closure 19 longitudinally within the holding chamber 13, into the pipe 12. In the illustrated example, longitudinal movement of the closure 19 is accomplished by providing threads on the pipe plug shaft 17 and threadedly affixing the latter in a pipe plug 20 threadedly secured within the opened end of the holding chamber 13, as can be best seen in FIG. 3. With this construction, when the nut 18 is rotated, the pipe plug shaft 17 and the closure 19 affixed thereto moves longitudinally up and down within the holding chamber 13.

The holding chamber 13, as can be best seen in FIG. 4, is cylinder shaped and has a pipe cut-out 23 in the one end thereof, which pipe cut-out 23 is correspondingly shaped to seat tightly on the peripheral surface of the pipe to which the add-on valve 10 is to be affixed. The opposite end of the holding chamber 13 has both exterior threads 24 and interior threads 25 provided thereon, for reasons which will become apparent from the description below.

The holding chamber 13 is affixed to a pipe 12 by seating it on the pipe, and welding it thereto with a beaded weld 26. If the pipe 12 cannot be welded, the holding chamber 13 can be affixed thereto in any appropriate fashion as, for example, by using an adhesive, heat fusion or a saddle.

A gate valve assembly 30, of a basically conventional construction next is affixed to the opened end of the holding chamber 13. The gate valve assembly 30, as can be seen in FIGS. 6 and 7, includes a valve cylinder 31 which is generally cylinder shaped and a valve gate chamber 32 which is integrally fixed to the valve cylinder 31 and includes a valve gate 34. The valve gate 34 is affixed to one end of the gate shaft 35 which extends through and out of the valve gate chamber 32 and has a handle 36 affixed to its end for operating it. The valve gate 34 and its associated gate shaft 35 can be threaded or of the push-pull type, to extend the valve gate 34 into the valve cylinder 31. The valve cylinder 31 includes a valve seat 38 for receiving therein the valve gate 34 for effectively closing or sealing the opened end of the holding chamber 13. Threads 39 and 40 also are provided within the valve cylinder 31, and the threads 40 are formed for threading engagement with the exterior threads 24 formed on the holding chamber 13.

After threadedly affixing the gate valve assembly 30 to the opened end of the holding chamber 13, as illustrated in FIG. 8, a saw chamber assembly 42 is removably threadedly secured within the gate valve assembly 30. The saw chamber assembly 42, as can be best seen in FIGS. 9–11, includes a saw chamber 43 which is generally cup-shaped and has a cylindrical shaped cavity 44 therein and exterior threads 45 provided thereon. The exterior threads 45 are formed for threading engagement with the threads 39 in the valve cylinder 31 of the gate valve assembly 30. A shaft aperture 46 extends through the closed end of the saw chamber 43, for receiving therethrough a saw blade shaft 50 of a saw assembly 48. A circular saw blade 49 is affixed to the saw blade shaft 50, and the one end of the latter is provided with a drill point 51. Normally, the circular saw blade 49 is disposed within the cavity 44, with the saw blade shaft 50 extending through and out of the shaft aperture 46, with appropriate sealing means being provided to seal the shaft aperture against leakage. A pneumatic or, where permissible, an electric drill 52 (FIG. 8) can be affixed to the end of the saw blade shaft 50 for rotating it to first drill and then cut an opening into the pipe 12, through the operation of the drill point 51 and the saw blade 49.

Accordingly, the next step in the method of affixing the add-on valve 10 to a pipe 12, after the saw chamber assembly 42 has been threadedly affixed to the gate valve assembly 30, is to cut a hole or opening into the pipe 12. While in the illustrated example, the means for cutting an opening into the pipe 12 is a circular saw blade 49, the cutting means can as well be a slot saw for cutting a slot into the pipe 12, through which a sliding gate valve thereafter can be extended. After sawing the opening into the pipe 12, the circular saw blade 49 is retracted into the cavity 44 of the saw chamber assembly 42, and the gate valve 34 of the gate valve assembly 30 is operated to close it to prevent the escape of fluid.

In FIG. 12, there is illustrated a pipe plug assembly 55 including a pipe plug 56 which is generally a solid cylindrical shaped plug having external threads 57 thereon and a closure 19 which is affixed to one end of the pipe plug shaft 59 which extends through the pipe plug 56. The closure 19, as indicated above, is in the form of a flexible cylinder which is formed to extend through the opening formed in the pipe 12 and which when forcibly urged against the side wall of the pipe 12 deforms and spreads to block off flow of fluid through the pipe 12. The pipe plug shaft 59 preferably is threaded as is the aperture in the pipe plug 56 through which it extends, so that the closure 19 can be longitudinally raised and lowered with respect to the pipe plug 56, by threading the pipe plug shaft 59 through the pipe plug 56.

Also disclosed in FIG. 12 is an insertion chamber assembly 63 including an insertion chamber 64 which is generally cup-shaped having a cylindrical shaped cavity 65 therein. An insertion shaft 66 extends through an aperture 70 in the closed end of the insertion chamber 64, with appropriate sealing means being provided to seal the aperture 70 against leakage. The lower end of the insertion shaft 66, as illustrated, has a coupler 67 formed thereon having a shaft cavity 68 therein which is formed to receive the pipe plug shaft 59. The lower terminal end of the coupler 67 can seat against the face of the pipe plug 56, to permit the pipe plug 56 to be rotated by the insertion shaft 66, to threadedly engage the pipe plug 56 within the opened end of the holding chamber 13, as described more fully below.

The pipe plug assembly 55 is disposed within the insertion chamber assembly 63, with the pipe plug shaft 59 disposed within the shaft cavity 68 of the coupler 67 and with the terminal end of the latter seated against the pipe plug 56. The insertion chamber assembly 63 then is threadedly engaged within the gate valve assembly 30, by threadedly engaging the threads 69 on the insertion chamber 64 with the threads 39 in the valve cylinder 31 of the gate valve assembly 30. The gate valve 30 then is opened, and the pipe plug 56 is pushed through and threadedly affixed within the holding chamber 13, by rotatably manipulating the insertion shaft 66 to threadedly engage the exterior threads 57 on the pipe plug 56 with the interior threads 25 in the holding chamber 13. After having threadedly affixed the pipe plug 56 within the holding chamber 13, the insertion chamber assembly 63 is threadedly removed from the gate valve assembly 30, and the coupler 67 threadedly removed from the pipe plug shaft 59. The gate valve assembly now is removed.

After removing the gate valve assembly 30 the completion bonnet 14 is affixed over the opened end of the holding chamber 13 to complete the installation of the add-on valve 10. The bonnet shaft 15 of the completion bonnet 14 has a coupler 71 on its lower end which is formed to receive the end of the pipe plug shaft 59 therein, to couple the two shafts together. Apertures 72 and 73 can be formed in the respective ends of the two shafts, for receiving a pin or the like for fixedly coupling the two shafts together. The interior of the completion bonnet 14 is threaded for threading engagement with the exterior threads 24 on the holding chamber 13, to affix the completion bonnet 14 to the holding chamber 13. The upper exposed end of the bonnet shaft 15 can be provided with a hand wheel or nut 18 for rotatably manipulating the bonnet shaft 15 and hence the pipe plug shaft 59 and the closure valve 58 affixed thereto to extend the closure valve 58 into the pipe 12 to block the flow of fluid therein.

From the above description, it can be seen that an add-on valve 10 is provided which can be easily and inexpensively added to a pipe in an existing piping system, without shutdown or interruption of flow. Furthermore, while the gate valve assembly 30, the saw chamber assembly 42 and the insertion chamber assembly 63 all form a part of the add-on valve 10, for the purpose of affixing the valve 10 to a pipe, these elements of the valve can be retained and used during the installation of other valves 10. Further still, it will be apparent that the add-on valve 10 can be adapted for automatic operation by certain modifications and the addition of a top-works consisting of a diaphragm, piston or other similar device. The valve 10 then could serve the functions of (1) an emergency shutoff, operated remotely or automatically; (2) a flow limiting restriction similarly operated; or (3) a pressure reducing monitor regulator to be installed ahead of existing pressure regulators to meet current safety requirements. In such an application, the pipe plug shaft 59, for example, can be a smooth shaft (unthreaded) and slip-fitted through the plug 57. Such an arrangement would enable the completed valve to be fitted with, for example, a diaphragm for automatic operation, in one or the other above-described applications.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. An add-on valve which can be added to an existing piping system at any point on a pipe in said system without interruption of the flow of fluid therein comprising, in combination:

a cylinder shaped holding chamber formed to be fixedly secured to a pipe and having an opened end;

a gate valve assembly adapted to be removably affixed to said opened end of said holding chamber and having a gate valve operable to seal said opened end;

a saw chamber assembly having saw means disposed therein for sawing an opening in said pipe, said saw chamber assembly being adapted to be removably affixed to said gate valve assembly and to seal said opened end of said holding chamber when said gate valve is opened, means coupled to said saw means to operate said saw means when said gate valve is opened to saw an opening in said pipe;

a pipe plug assembly including a pipe plug adapted to be secured within said holding chamber to seal the open end thereof to permit said gate valve assembly to be removed, a pipe plug shaft extending through said pipe plug and longitudinally movable therein, and a closure valve affixed to one end of said pipe plug shaft and adapted to block the flow of fluid in said pipe when disposed therein;

an insertion chamber assembly adapted to be removably affixed to said gate valve assembly to seal said opened end of said holding chamber and formed to receive therein said pipe plug assembly, an insertion shaft adapted to be coupled to the other end of said pipe plug shaft extending through said insertion chamber assembly and longitudinally movable therein to operate said pipe plug shaft, said insertion chamber being removably affixed to said gate valve assembly after sawing an opening in said pipe and after said saw chamber assembly has been removed and said gate valve has been closed, said pipe plug being affixed within the opened end of said holding chamber by opening said gate valve and operating said insertion shaft, said pipe plug sealing said opened end upon being affixed therein; and a completion bonnet adapted to be affixed to and to seal said opened end of said holding chamber after removing said gate valve assembly and formed to permit said pipe plug shaft to be operated to extend said closure valve into said pipe through said opening sawn therein to block the flow of fluid through said pipe.

2. The add-on valve of claim 1, wherein said holding chamber has both interior and exterior threads formed on the opened end thereof, said gate valve assembly being threaded to threadingly engage with said exterior threads on said holding chamber, said pipe plug being threaded to threadingly engage with said interior threads on said holding chamber, said insertion chamber being provided with exterior threads and said gate valve assembly being interiorly threaded to threadingly engage with said exterior threads on said insertion chamber said completion bonnet having interior threads thereon for threading engagement with the exterior threads on said holding chamber.

3. The add-on valve of claim 1, wherein said pipe plug shaft is slidably received within said pipe plug whereby said pipe plug shaft is longitudinally movable with respect to said pipe plug by applying a longitudinal force on it by means of a piston, diaphragm or the like.

4. The add-on valve of claim 1, wherein said pipe plug and said pipe plug shaft are correspondingly threaded whereby said pipe plug shaft is longitudinally movable with respect to said pipe plug by rotating it to thread it through said pipe plug.

5. The add-on valve of claim 1, wherein said closure valve of said pipe plug assembly comprises a flexible cylinder which expands or balloons when forcibly urged against the interior of said pipe to thereby block passage of fluid through said pipe.

6. The add-on valve of claim 1, wherein said completion bonnet comprises a bonnet shaft adapted to be coupled to said other end of said pipe plug shaft extending through said completion bonnet and longitudinally movable therein to operate the latter, said completion bonnet being adapted to be affixed to and to seal said opened end of said holding chamber after removing said gate valve assembly, means affixed to said bonnet shaft to operate said bonnet shaft and said pipe plug shaft coupled thereto to extend said closure valve into said pipe through said opening sawn therein to block the flow of fluid through said pipe.

7. The add-on valve of claim 1, wherein said pipe plug shaft extends through said completion bonnet and has means affixed to its end for operating it to extend said closure valve into said pipe to block the flow of fluid through said pipe.

8. A method of affixing an add-on valve to an existing piping system at any point on a pipe in said system without interruption of the flow of fluid therein comprising the steps of:

affixing a cylinder shaped holding chamber having an open end to a pipe;

removably affixing a gate valve assembly having a gate valve to said open end of said holding chamber;

affixing a saw chamber assembly having a chamber for sealing the open end of said holding chamber and saw means disposed within said chamber for sawing an opening in said pipe to said gate valve assembly;

opening said gate valve of said gate valve assembly and operating said saw means to saw an opening in said pipe;

withdrawing said saw means into said chamber of said saw chamber assembly, closing said gate valve, and removing said saw chamber assembly from said gate valve assembly;

affixing within said gate valve assembly an insertion chamber having therein a pipe plug assembly including a pipe plug shaft, a pipe plug movably affixed on said pipe plug shaft and a closure valve affixed to one end of said pipe plug shaft;

opening said gate valve and affixing said pipe plug within said holding chamber to seal the open end thereof;

removing said insertion chamber and said gate valve assembly from said holding chamber; and affixing a completion bonnet to said open end of said holding chamber to permit said pipe plug shaft to be operated to extend said closure valve into and out of said pipe to block and permit the flow of fluid therein.

* * * * *